US010785971B2

(12) United States Patent
Moerman

(10) Patent No.: US 10,785,971 B2
(45) Date of Patent: Sep. 29, 2020

(54) HORSESHOE WITH DUAL-SIDED GROOVES CENTERED ON A BRIDGE FOR SPLITTING THE HORSESHOE INTO TWO HALVES

(71) Applicant: Travel and Trade BVBA, Sint-Andries Brugge (BE)

(72) Inventor: Sam Moerman, Zulte Olsene (BE)

(73) Assignee: EQUINOVUM BV, Sint-Andries Brugge (BE)

( * ) Notice: Subject to any disclaimer, the term of this patent is extended or adjusted under 35 U.S.C. 154(b) by 0 days.

(21) Appl. No.: 16/686,481

(22) Filed: Nov. 18, 2019

(65) Prior Publication Data

US 2020/0085028 A1    Mar. 19, 2020

Related U.S. Application Data

(63) Continuation of application No. 15/290,792, filed on Oct. 11, 2016, now Pat. No. 10,477,852, which is a continuation of application No. 14/346,310, filed as application No. PCT/EP2012/068591 on Sep. 21, 2012, now abandoned.

(30) Foreign Application Priority Data

Sep. 21, 2011    (BE) .................................. 201100557

(51) Int. Cl.
*A01L 1/04*    (2006.01)
(52) U.S. Cl.
CPC ...................................... *A01L 1/04* (2013.01)

(58) Field of Classification Search
CPC ................. A01L 1/00; A01L 1/02; A01L 1/04
See application file for complete search history.

(56) References Cited

U.S. PATENT DOCUMENTS

| 150,810 A | 5/1874 | Austin |
| 170,911 A | 12/1875 | Smith |
| 196,446 A | 10/1877 | Hague |
| 292,302 A | 1/1884 | Hall |
| 826,958 A | 7/1906 | O'Brien |
| 866,558 A | 9/1907 | Barker |
| 3,090,718 A | 5/1963 | Dixon |
| 4,557,334 A * | 12/1985 | Cattaneo ................... A01L 7/02 168/12 |
| 5,158,143 A | 10/1992 | Campbell |

(Continued)

FOREIGN PATENT DOCUMENTS

| DE | 102010037762 A1 | 5/2010 |
| DE | 102008060198 A1 * | 6/2010 ............... A01L 1/02 |

(Continued)

OTHER PUBLICATIONS

Benedicte Annys translation of DE 102008060198 (Year: 2010).*

(Continued)

*Primary Examiner* — Lisa L Tsang
(74) *Attorney, Agent, or Firm* — Nixon Peabody LLP

(57) ABSTRACT

Horseshoe comprising two legs connected by a bridge (3), characterized the bridge (3) comprises physical markers (1, 2) provided directly opposite one another in both a support surface (5) and a ground surface (4), wherein said physical markers (1, 2) function as a guide for cutting through the bridge (3) of the horseshoe.

12 Claims, 4 Drawing Sheets

(56) References Cited

U.S. PATENT DOCUMENTS

| | | | |
|---|---|---|---|
| 6,056,062 A | 5/2000 | Robison | |
| 6,076,607 A | 6/2000 | Bergeleen | |
| 6,263,973 B1 * | 7/2001 | Bergeleen | A01L 1/00 168/4 |
| 6,401,828 B1 | 6/2002 | Rafeld | |
| 2002/0023760 A1 | 2/2002 | Bergeleen | |

FOREIGN PATENT DOCUMENTS

| | | |
|---|---|---|
| DE | 102008060198 A1 | 6/2010 |
| FR | 483953 A | 8/1917 |

OTHER PUBLICATIONS

USPTO human translation of DE 102008060198 (Year: 2010).*
Google Patents translation of DE 102008060198 (Year: 2010).*
International Search Report dated Oct. 17, 2012.
Benedicte Annys human translation of DE 102008060198 A1 (2019) (8 pages).
Google machine translation of DE 102008060198 A1 (2019) (19 pages).
USPTO-provided human translation of DE 102008060198 A1 (2019) (21 pages).

* cited by examiner

HORSESHOE WITH DUAL-SIDED GROOVES CENTERED ON A BRIDGE FOR SPLITTING THE HORSESHOE INTO TWO HALVES

CROSS-REFERENCE TO RELATED APPLICATION

This application is a continuation of U.S. application Ser. No. 15/290,792, filed Oct. 11, 2016, now allowed, which is a continuation of U.S. application Ser. No. 14/346,310, filed Mar. 20, 2014, which is a U.S. National Stage of International Application No. PCT/EP2012/068591, filed Sep. 21, 2012, which claims priority to Belgium Application Serial No. BE201100557, filed Sep. 21, 2011, all of which are hereby incorporated by reference in their entirety.

FIELD OF THE INVENTION

The present invention concerns a horseshoe comprising two legs connected by a bridge. The present invention further concerns a method for upgrading existing horseshoes as well as a method for applying a horseshoe according to the invention on a hoof of an ungulate.

BACKGROUND OF THE INVENTION

Horseshoes are used to cover the hooves of ungulates, amongst others to prevent damage and wear and tear of the hooves, and more specifically to keep the natural movement, such as the resilience and flexibility in the hooves; intact.

When applying horseshoes there is a constant challenge to keep the hoof mechanism as intact as possible.

The proper operation of the hoof mechanism ensures good blood circulation and cushioning in the hooves and legs when the horse moves.

The operation of the hoof mechanism is activated because the hoof is able to change its resilience and shape when the hoof is stressed by the impact of the horse's weight on the surface over which the horse is moving.

When the hoof is stressed, the sole of the hoof is pushed down, causing the radius to share the pressure and compress the hoof, making it laterally and medially wider at the ground surface of the hoof, which causes a cushioning effect that benefits the legs of the horse.

When the hoof is no longer stressed, it returns to its original form and becomes laterally and medially smaller at the ground surface.

The change in shape of the hoof during stressing and relieving causes a pump effect in the hoof, which encourages the blood circulation in the hoof and the legs of the horse.

The stimulation of blood circulation created by the pump effect which takes place in the feet, also have a supporting effect on the general blood circulation in the horse's body.

Good blood circulation facilitates the supply of oxygen, nutrients and removal of waste which improves the performance and recovery.

The flexibility and resilience of the hoof enables the hoof to absorb lateral and medial bumps in the surface over which the horse is moving, which benefits the upper joints, tendons and ligaments as they have little lateral or medial movement or flexing.

It is therefore very important that the flexibility and resilience of the hoof remains as intact as possible when fitting an horseshoe, ensuring that the hoof mechanism can work optimally.

It is therefore important to reduce the fixation of the hoof to a minimum when fitting the horseshoe and to maintain the flexibility and resilience in the hoof.

A traditional horseshoe fixes the lateral and medial side of the hoof with a non-flexible or non-bendable U-shaped or closed element in metal, aluminum, titanium, plastic or other related materials that is attached to the hoof using hoof nails, which hampers the hoof mechanism.

When applying traditional horseshoes; the horseshoe is fitted on an unstressed (lifted) hoof wherein the hoof remains in its smallest position, when applying the shoeing the hoof is fixed in its unstressed position, severely hampering the flexibility and resilience when the hoof impacts the surface.

The impact of the fixation created by applying the horseshoe on unstressed hooves has a far worse effect on the flexibility and resilience of the hoof when the horse moves, this impact creases together with the speed at which the horse moves.

The fixation of the hoof with the traditional horseshoe severely hampers the change of shape of the hoof, which causes the cushioning of the hooves to be severely reduced, sending the shock to the upper joints, which results in foot, leg or other problems.

When applying traditional horseshoes, the lateral and medial side of the hoof is fixed so that the lateral and medial stress on the hoof can no longer be absorbed individually, creating additional stress on the horses joints and legs since it can permit little or no lateral deflection or stress.

The obstruction of the hoof mechanism with the fixation of the hoof using traditional horseshoes also hampers the pump effect that is generated with the change of shape of the hoof created when the horse moves, resulting in reduced stimulation of blood circulation.

The fixation of the hoof will also negatively affect the horse's performance since the oxygen supply to the legs and hooves are stimulated less by the pump effect of the hoof mechanism, which influences the performance and recovery.

The fixation of the hoof will also result in a reduced blood circulation, which will have a negative influence on the supply and discharge of nutrients and waste, this in turn can have a negative influence on the quality of the hoof.

In an attempt to address the abovementioned issues related to the traditional shoeing for ungulates several types of horseshoes have been described.

DE 10 2010 037 762 and US 2002/0023760 for example disclose a horseshoe comprising two legs connected by a bridge, wherein the bridge is flexible such as to allow "independent" vertical and lateral movement of the legs when attached on a hoof.

The disclosed prior art horseshoes however have the important drawback that they are very difficult to fit and subsequently fixed on a hoof due to lack of rigidity of the bridge of the horseshoes or even worse break along the bridge when forcing the horseshoe in a form fitting the hoof. Indeed, when fitting a horseshoe, a farrier bends the horseshoe along the bridge to fit the legs of the horseshoe on the hoof of the ungulate. This can be done both warm and cold, depending on the farriers preference or the relevant horseshoe. Once bent in the right position, the horseshoe ideally rigidly remains its adjusted shape allowing the farrier to attach the horseshoe to the hoof and to finish the horseshoe.

Another drawback of the horseshoes described in DE 10 2010 037 762 and US 2002/0023760 is that these horseshoes are rather expensive and difficult in manufacturing and fitting, resulting a considerable higher cost for both the horseshoe and the application thereof on a hoof.

DE 102008060198 discloses a horseshoe comprising a frangible section in the bridge of the horseshoe for separating the horseshoe legs from one another after attaching the horseshoe on a hoof.

A drawback of a horseshoe according to DE 102008060198 is that the horseshoe is prone to break when fitting the horseshoe. Moreover this type of horseshoe is considered difficult to divide along the frangible section without the risk of hurting the ungulate.

It is clear that based on the prior art there remains q need for a horseshoe that addresses the above problems and drawbacks.

SUMMARY OF THE INVENTION

The present invention concerns a horseshoe comprising two legs connected by a bridge, characterized the bridge comprises physical markers provided directly opposite one another in both a support surface i.e. the surface of the horseshoe facing the hoof when in use and on the ground surface facing away from the hoof when in use, wherein said physical markers function as a guide between an outer circumference of the bridge and an inner circumference of the bridge, for cutting through the bridge of the horseshoe.

The invention further concerns a method of application of a horseshoe as identified here above, the method comprising the steps of:
a. Fitting the horseshoe to a hoof and potentially adapting the horseshoe shape to the concerning hoof;
b. Attaching the horseshoe to the hoof;
c. Dividing the horseshoe in two parts by cutting through or sawing through the bridge along the physical marker in the ground surface of the horseshoe Finally the invention concerns a method of upgrading a (traditional) horseshoe, the method comprising the step of: providing physical markers on the bridge of the horseshoe at positions directly opposite one another both on the around surface and the support surface.

BRIEF DESCRIPTION OF THE DRAWINGS

With the intention to better indicate the characteristics the invention, the implementation form of this method is provided below as example, without any restrictive character, with reference to accompanying FIGS. 1 through 4 where:

FIG. 1a represents a one-piece horseshoe (10) according to the invention with physical markers (1) applied in the toe section (3) on the ground surface (4)

FIG. 1b represents a one-piece horseshoe (10) according to the invention with physical markers (2) applied in the toe section on the support basis (5)

FIG. 2a reflects the position of the physical markers (1 and 2) in the ground surface (4) and the support basis (5) with the inner circumference (6) of the one-piece horseshoe (10)

FIG. 2b reflects the position of the physical markers (1 and 2) in the ground surface (4) and the support basis (5) with the outer circumference (7) of the one-piece horseshoe (10)

FIG. 3a reflects the position of the one-piece horseshoe (10) applied in the hoof by means of hoof nails, with cut groove (8) in the support basis (5), this cut groove (8) was cut with the reference of the physical markers (2) serving as guide grooves applied in the same support basis (5) as seen from the rear of the hoof FIG. 3b reflects the position of the one-piece horseshoe (10) applied in the hoof by means of hoof nails, with cut groove (8) in the support basis (5), this cut groove (8) was cut with the reference of the physical markers (2) serving as guide grooves applied in the same support basis (5) as seen from the front of the hoof

GENERAL LEGEND OF FIGURES

Figure 1A:
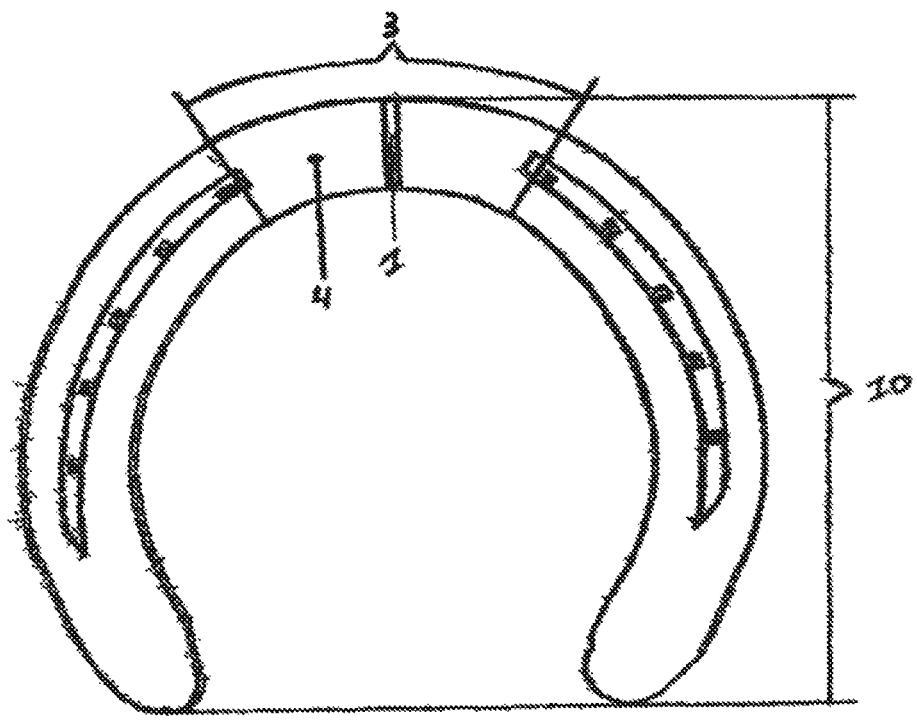
FIGS. 1a and 1b: ground surface (4) and support basis (5) horseshoe
Figure 1B:
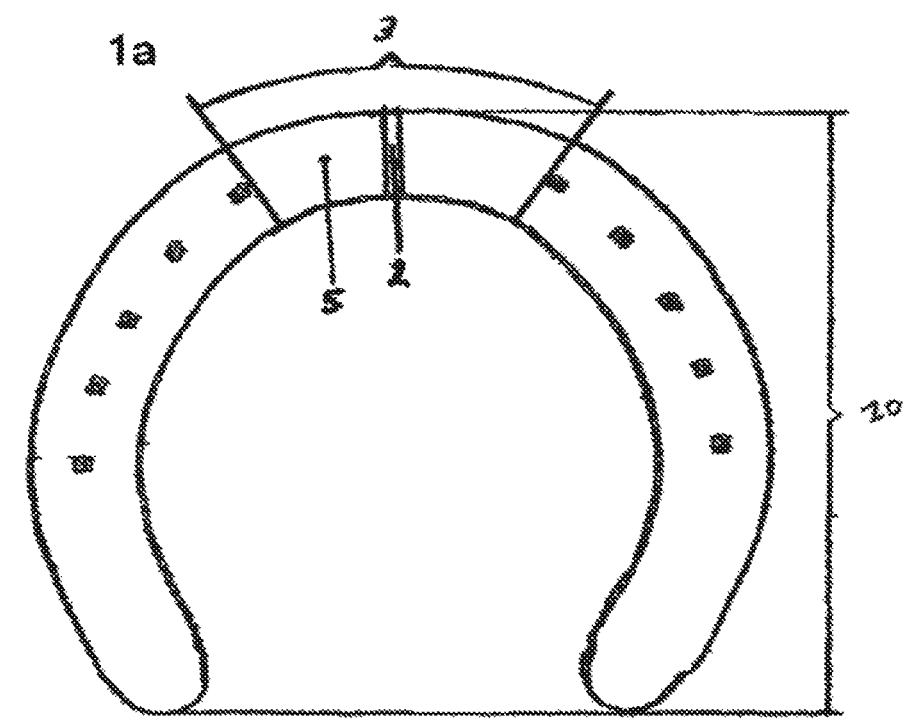

1=physical marker in the ground surface
2=physical marker in the support basis
3=toe section of horseshoe
4=ground surface of horseshoe
5=support basis of horseshoe
6=inner circumference of horseshoe
7=outer circumference of horseshoe
8=cut marker 2
9=marker 1 cut through
10=one-piece horseshoe
11=two-piece horseshoe FIG. 1 represents a horseshoe according to the present invention, the horseshoe comprising two legs connected by a bridge 3, the bridge 3 comprising physical markers 1 and 2 provided directly opposite one another in both a support surface 5 i.e. the surface of the horseshoe facing the hoof when in use and on the ground surface 4 facing away from the hoof when in use, wherein said physical markers 1, 2 function as a guide between an outer circumference of the bridge and an inner circumference of the bridge, for cutting through the bridge 3 of the horseshoe.

The horseshoe can be manufactured in amongst others, metal, steel, aluminum, titanium, copper, plastic or an admixture thereof.

Figure 2A:
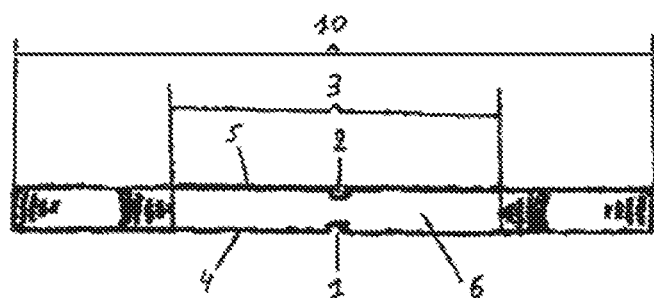
FIGS. 2a and 2b: inner circumference (6) and outer circumference (7) horseshoe
Figure 2B:
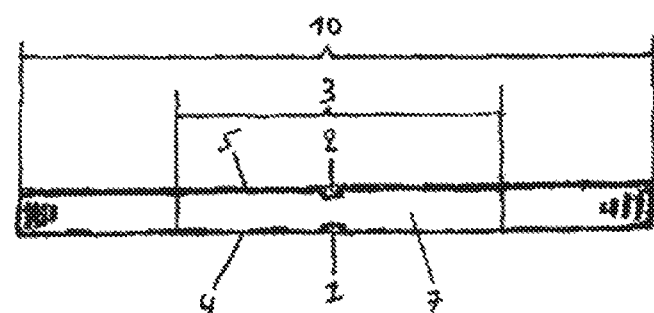

Preferably the physical markers 1 and 2 comprise a groove depicted in FIG. 2. Alternatively a line can be used as physical marker on either the ground surface 4 and/or the support surface 5.

The physical marker 1, 2, here a groove preferably extends over the entire width of the concerning bridge 3 surface from an outer circumference 7 of the bridge and an inner circumference 6 of the bridge.

In case the physical marker is executed as a groove, it is important that the remaining material section of the bridge in the section of the physical marker provides sufficient strength and rigidity to the horseshoe such that during fitting the horseshoe does not break and yet remains it adapted form allowing easy fixation of the horseshoe on the concerning hoof.

The depth of the physical marker groove 1 in the ground surface 4 of the bridge is therefore preferably maximally about 60% of the thickness of the bridge 3 of the horseshoe, whereas the depth of the physical marker groove 2 in the support surface 5 of the bridge 3 is preferably maximally about 15% of the thickness of the bridge 3 or vice versa.

The horseshoe according to the invention can be easily fitted and attached to a hoof of an ungulate by the following method according to the invention, the method comprising the steps of:
  a. Fitting the horseshoe to a hoof and potentially adapting the horseshoe shape to the concerning hoof;
  b. Attaching the horseshoe to the hoof;
  c. Dividing the horseshoe in two parts by cutting through or sawing through the bridge 3 along the physical marker 1 in the ground surface 4 of the horseshoe.

Preferably, the method comprises the additional step a') of making a physical groove 8 or deepening the groove in the support surface 5 of the horseshoe using the physical marker 2 as a guide in between steps a) and b).

By applying this additional step a') after step a) wherein a certain rigidity of the horseshoe is required to avoid breaking thereof during fitting, the cutting through or sawing through of the bridge 3 after attaching the horseshoe on a hoof is made easier (FIG. 3) and hurting the animal or damaging the hoof can be avoided as the distance from the maintaining material to the hoof is enlarged.

Figure 4A:
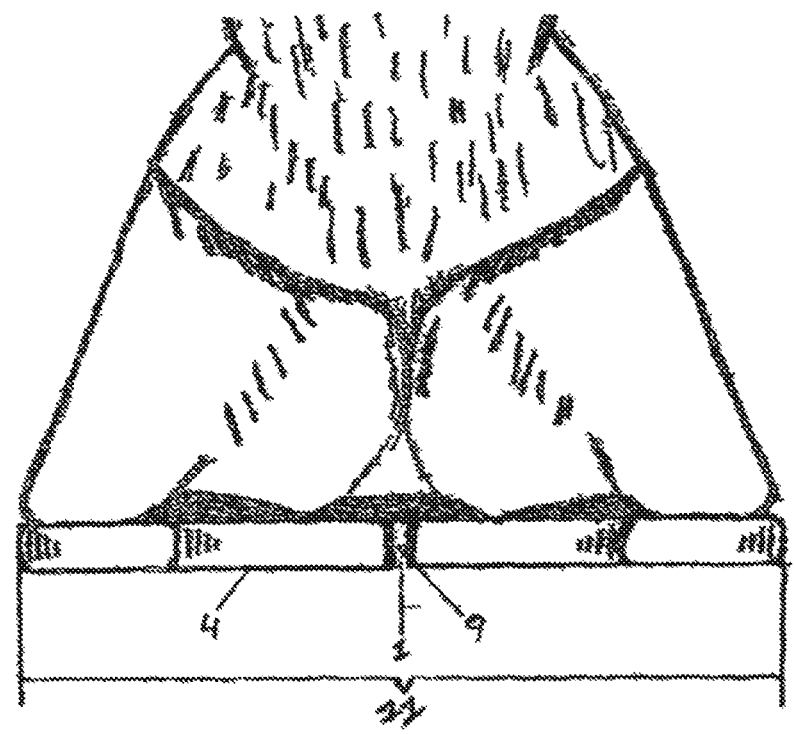
FIG. 4a and 4b: applied two-piece horseshoe (11) front and rear view FIG. 4a reflects the position of a two-piece horseshoe (11) on the hoof that originates after the horseshoe has been cut through, with the reference of the physical marker (1), serving as guide groove (9) applied in the same ground surface (4) as seen from the rear of the hoof FIG. 4b reflects the position of a two-piece horseshoe (11) on the hoof that originates after the horseshoe has been cut through, with the reference of the physical marker (1), serving as guide groove (9) applied in the same ground surface (4) as seen from the front of the hoof
Figure 4B:
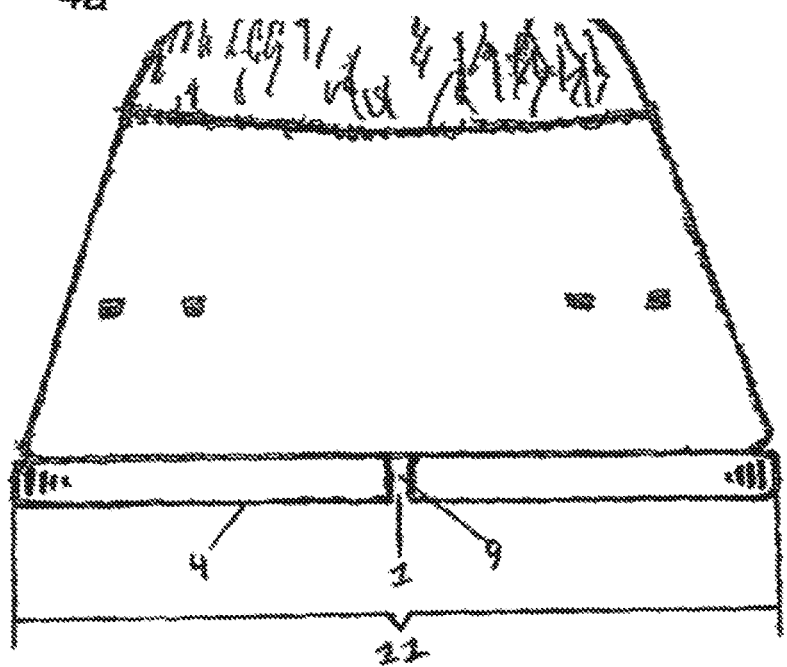

As represented in FIG. 4, when completing the method according to the present invention, a horseshoe is obtained that is fixed to a hoof and comprises two separate parts divided by a cutting or sawing line 9. As such the horseshoe provides a solution to the abovementioned issues regarding the lateral and medial fixation of the foot, the hoof mechanism, the resilience of the hoof, the high degree of difficulty of the fabrication and the application of the pre-designed horseshoes to keep the hoof mechanism and the cushioning of the hoof as intact as possible.

Another advantage of the horseshoe and method for application thereof according to the present invention is that for a farrier this method hardly or even not comprises more effort for the farrier than when applying a traditional horseshoe that remains in one piece after application.

Figure 3A:
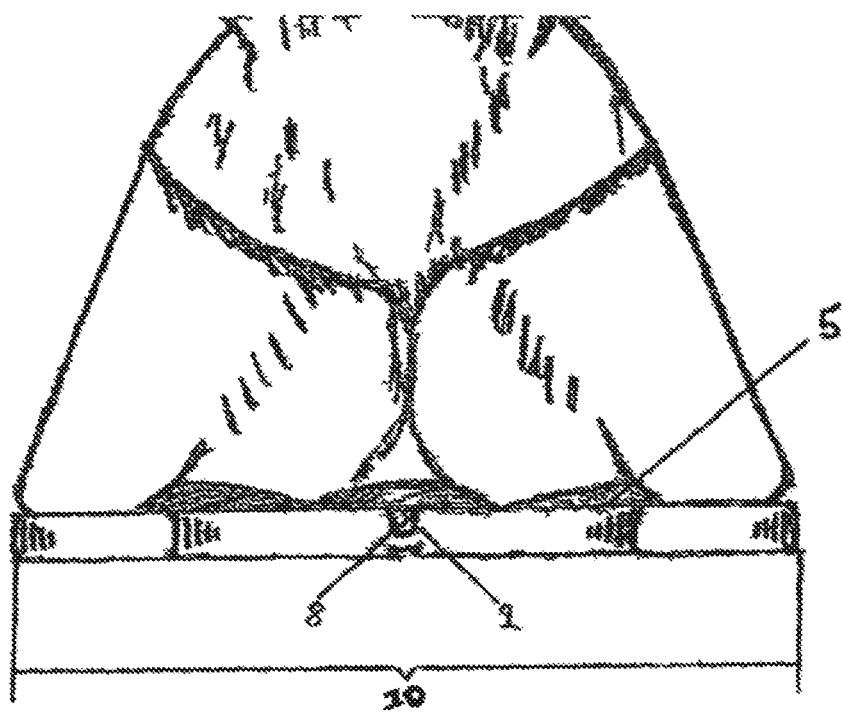
FIGS. 3a and 3b: applied one-piece horseshoe 10) front and rear view
Figure 3B:
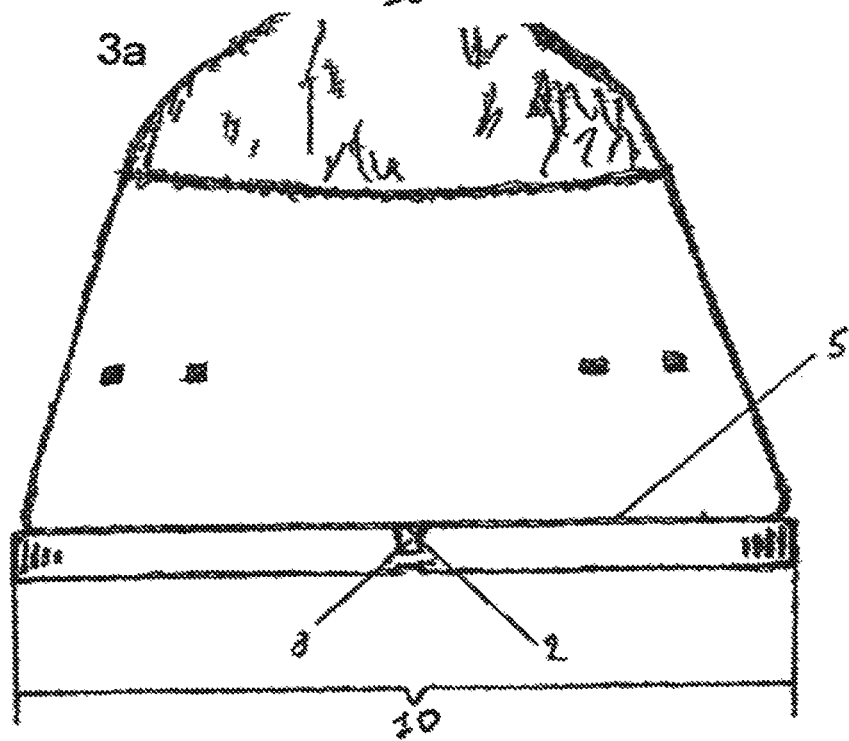

The farrier can fit the horseshoe as with traditional horseshoes, this can be done both warm and cold depending on the farriers' preference or the relevant horseshoe, When the horseshoe is fitted using the traditional method, the farrier deepens the physical marking located in the support surface of the horseshoe, serving as guide grooves, until approximately 60% of the thickness of the horseshoe is as such that the shape of the appropriate horseshoe remains intact, but only a minimal of material is present between the grooves 1 and 8 in the bridge (FIG. 3).

After this operation, the horseshoe is further attached and finished on the hoof with the traditional method by means of hoof nails.

After the horseshoe is applied and finished traditionally, the farrier will cut the physical marker in the surface of the horseshoe, serving as guide grooves, the remaining thickness of the horseshoe, changing the horseshoe from a single element into a horseshoe made of two elements, which in turn can follow the lateral and media changes in the hoof, individually.

Reducing the fixation of the horseshoe to a minimum, results in a better operation of the hoof mechanism. This ensures that the blood circulation is better stimulated than with the usual traditional horseshoe.

Reducing the fixation of the horseshoe to a minimum ensures a better operation of the hoof mechanism, creating the pump effect in the hooves which encourages the blood circulation and has a supporting effect on the general blood circulation in the horse's body.

Reducing the fixation of the horseshoe to a minimum ensures a better operation of the hoof mechanism which, through the stimulation of good blood circulation, ensures a good supply and discharge of oxygen, nutrition and waste which benefits the performance, recovery and good hoof quality of the hooves.

Reducing the fixation of the horseshoe to a minimum enables the hoof to change shape and to be become wider on the ground when it is stressed and compressed between the weight of the horse and the surface over which the horse is moving, resulting in proper cushioning in the hooves and the legs of the horse.

The invention claimed is:

1. A shoe configured to be attached to a hoof of an ungulate, the shoe comprising:
   a support surface facing the hoof when attached directly thereto;
   an exposed ground-facing surface facing a ground surface when the support surface is attached to the hoof;
   a first leg and a second leg, each of the first and second legs having a plurality of holes arranged in a recess on the ground-facing surface; and
   a bridge;
   the shoe having a first configuration and a second configuration, the first and second configurations each comprising:
     the bridge extending along an entire distance between a closest one of the plurality of holes of the first leg and a closest one of the plurality of holes of the second leg to define a width of the bridge, the bridge having a first groove on the support surface and a second groove directly opposite and co-aligned with the first groove on the ground-facing surface,
     each of the first groove and the second groove extending across the bridge from an outer circumference of the bridge to an inner circumference of the bridge between the two free sides thereof such that the bridge has a reduced thickness between the first and second grooves, wherein a side of the bridge along the inner circumference is free,
     the first groove and the second groove being in a center of the bridge,
   the shoe having the first configuration in which the shoe is a single unitary piece having the first and the second grooves, wherein in the first configuration a height of the bridge has uniformity between the inner circumference and the outer circumference across the entire width of the bridge, and the first groove having an initial depth in the first configuration,
   the shoe having the second configuration in which the shoe is unattached to the hoof, the first groove having a depth that is at least twice as deep as the initial depth in the second configuration, wherein an overall shape of the shoe remains intact in the first configuration and the second configuration,
   the shoe being rigid in the first and second configurations and being composed of a material including a metal or a polymer or a combination thereof, such that the uniform height and the width of the bridge and a distance along the outer circumference between the first and second legs in the first and second configurations are unchanged; and
   the shoe having a third configuration when attached to the hoof, the third configuration in which the bridge is composed of two separate and immediately adjacent halves to permit lateral and medial movement of the shoe.

2. The shoe of claim 1, wherein a depth of the first groove is maximally 60% of a thickness of the bridge or the second groove is maximally 15% of the thickness of the bridge, or vice versa, in the first or second configurations.

3. The shoe of claim 2, wherein the depth of the first groove is maximally 60% of the thickness of the bridge between the two legs in the second configuration.

4. The shoe of claim 2, wherein the depth of the second groove is maximally 60% of the thickness of the bridge between the two legs in the second configuration.

5. The shoe of claim 1, wherein a minimal of shoe material is present between the first and the second groove in the second configuration while the shoe remains a single, unitary piece.

6. The shoe of claim 1, the shoe being a horseshoe, the ungulate being a horse.

7. The shoe of claim 1, wherein the shoe includes a rigid material selected from the group consisting of steel, aluminum, titanium, copper, plastic, or an admixture thereof.

8. The shoe of claim 1, wherein each of the first groove and the second groove extend over an entirety of the height of the bridge.

9. The shoe of claim 1, wherein the first groove and the second groove are in a center of the bridge equidistant between the closest one of the plurality of holes of the first leg and the closest one of the plurality of holes of the second leg.

10. The shoe of claim 1, wherein the material of the shoe in the bridge between the first groove and the second groove provides the shoe with rigidity to maintain the shoe's shape in the first configuration.

11. The shoe of claim 10, wherein the material also provides the shoe with rigidity to maintain the shoe's shape in the second configuration.

12. A method comprising a step of providing a shoe according to claim 1.

* * * * *